United States Patent
Gainer

(10) Patent No.: US 8,261,867 B1
(45) Date of Patent: Sep. 11, 2012

(54) WHEELED VEHICLE DRIVE APPARATUS

(76) Inventor: Della R. Gainer, Lynn Haven, FL (US)

( * ) Notice: Subject to any disclaimer, the term of this patent is extended or adjusted under 35 U.S.C. 154(b) by 296 days.

(21) Appl. No.: 12/649,663

(22) Filed: Dec. 30, 2009

(51) Int. Cl.
*B60K 1/00* (2006.01)
(52) U.S. Cl. .................... 180/65.6; 180/60; 903/952
(58) Field of Classification Search ............. 180/60, 180/63, 65.51, 65.6; 903/952
See application file for complete search history.

(56) References Cited

U.S. PATENT DOCUMENTS

| | | | |
|---|---|---|---|
| 3,270,267 A * | 8/1966 | Nolte, Jr. .................. 320/138 |
| 4,629,950 A * | 12/1986 | Ching .................... 318/285 |
| 4,771,840 A | 9/1988 | Keller | |
| 5,161,630 A * | 11/1992 | Garin et al. ............. 180/65.31 |
| D443,563 S | 6/2001 | Johnson | |
| 6,334,497 B2 | 1/2002 | Odell | |
| 6,360,836 B1 * | 3/2002 | Milano et al. .......... 180/65.6 |
| 6,481,514 B2 | 11/2002 | Takada | |
| 6,729,422 B2 | 5/2004 | Chu et al. | |
| 6,758,314 B2 * | 7/2004 | Woodruff ............. 191/12.2 R |
| 6,860,347 B2 | 3/2005 | Sinclair et al. | |
| 7,174,093 B2 | 2/2007 | Kidd et al. | |
| 8,033,348 B1 * | 10/2011 | Parkhe ................. 180/19.1 |
| 2003/0189376 A1 * | 10/2003 | Schneider et al. ........... 303/112 |
| 2005/0034906 A1 * | 2/2005 | Liao ................... 180/65.6 |
| 2008/0202833 A1 * | 8/2008 | Dickie ................. 180/65.6 |

* cited by examiner

*Primary Examiner* — John Walters

(57) ABSTRACT

The wheeled vehicle drive apparatus attaches to an existing wheeled vehicle, such as a wheelchair or shopping cart and uses the existing wheels of the vehicle for drive. The circular drive case provides efficient space utilization in typically cramped confines in and around a wheeled vehicle. The two-piece case allows easy service and parts replacement. Two levers are provided for attachment to existing vehicle handles, with one providing throttle speed control and one providing breaking. Braking is provided internal to the drive case, thereby negating the need for an external brake on the vehicle. Positive engagement with vehicle wheels is assured by the adapters with adapter lugs.

3 Claims, 6 Drawing Sheets

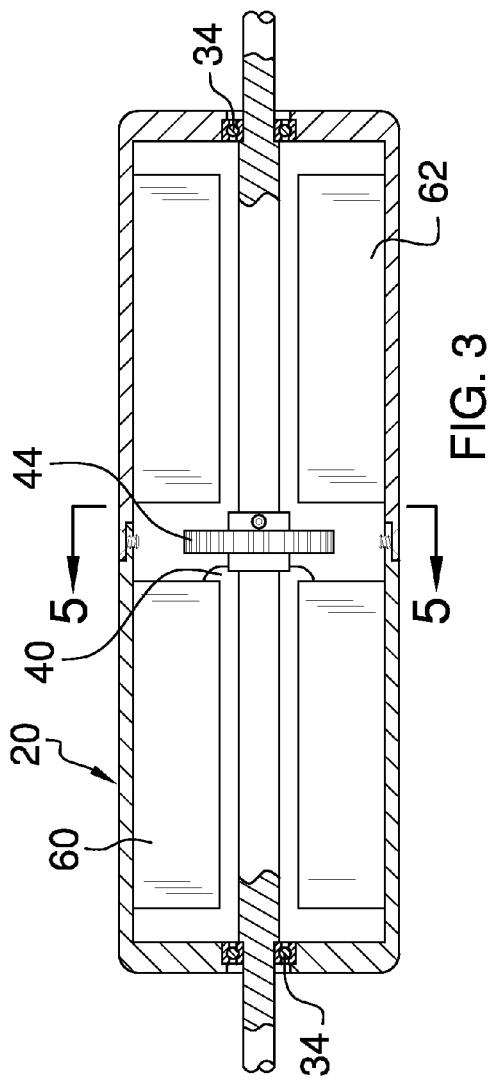
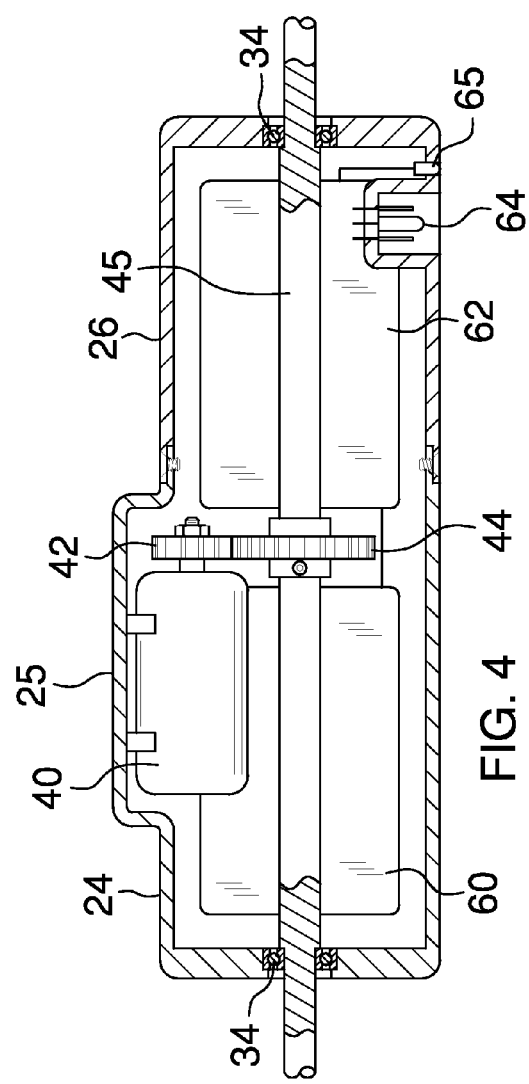
FIG. 3
FIG. 4

WHEELED VEHICLE DRIVE APPARATUS

BACKGROUND OF THE INVENTION

For various reasons, individuals tire or have difficulties in propelling wheelchairs, carts, and other wheeled vehicles form behind. Perhaps an incline, age, disability, or any of a number of factors add to such difficulties. Various devices have addressed such difficulties, all with various problems or perhaps not all suited to all applications and users. Complex devices that add extra wheels for propelling wheeled vehicles have often been undesirable to most due to personal dislikes, complicated ground drive contact problems over varied surfaces, or incomplete traction, as example of some undesirable traits. What has been needed and wanted by some is a wheeled vehicle drive apparatus that attaches directly to existing wheels of a wheeled vehicle and offers drive controls to the person pushing that vehicle. The present apparatus provides this solution.

FIELD OF THE INVENTION

The wheeled vehicle drive apparatus relates to wheeled carts, wheel chairs, and the like and more especially to a drive apparatus for attachment to same, with hand speed control and hand brake control.

SUMMARY OF THE INVENTION

The general purpose of the wheeled vehicle drive apparatus, described subsequently in greater detail, is to provide a wheeled vehicle drive apparatus which has many novel features that result in an improved wheeled vehicle drive apparatus which is not anticipated, rendered obvious, suggested, or even implied by prior art, either alone or in combination thereof.

To attain this, the wheeled vehicle drive apparatus attaches to an existing wheeled vehicle, such as a wheelchair or shopping cart. The apparatus uses the existing wheels of the vehicle for drive, with power going to two opposed wheels via the two-ended axle of the drive case, in the most complete embodiment. Power may also be supplied to only one wheel in a more basic embodiment. The circular drive case provides efficient space utilization in typically cramped confines in and around a wheeled vehicle. The most complete embodiment provides a two-piece case that allows easy service and parts replacement. Each adapter with adapter lugs and square receiver importantly provides positive engagement with an existing wheeled vehicle.

Two levers are provided for attachment to existing vehicle handles, with one providing throttle speed control and one providing breaking. An important feature of the apparatus is the internal braking wherein the brake lever instructs the control box internal to the drive case to stop motion of the apparatus, thereby negating the need for an external brake, and thereby saving complexity and expense. The brake lever is progressive.

Thus has been broadly outlined the more important features of the improved wheeled vehicle drive apparatus so that the detailed description thereof that follows may be better understood and in order that the present contribution to the art may be better appreciated.

An object of the wheeled vehicle drive apparatus is to attach to an existing wheeled vehicle.

Another object of the wheeled vehicle drive apparatus is to propel the existing wheeled vehicle via electrical power.

A further object of the wheeled vehicle drive apparatus is to offer control of the drive apparatus to a person pushing the wheeled vehicle.

An added object of the wheeled vehicle drive apparatus is to provide speed control.

And, an object of the wheeled vehicle drive apparatus is to provide braking control of the wheeled vehicle.

Still another object of the wheeled vehicle drive apparatus is to provide braking control internal to the apparatus.

Yet another object of the wheeled vehicle drive apparatus is to be easily maintained and repaired.

Still another object of the wheeled vehicle drive apparatus is to provide a plurality of rechargeable batteries for power.

And, an object of the apparatus is to provide positive wheel engagement with a wheeled vehicle.

These together with additional objects, features and advantages of the improved wheeled vehicle drive apparatus will be readily apparent to those of ordinary skill in the art upon reading the following detailed description of presently preferred, but nonetheless illustrative, embodiments of the improved wheeled vehicle drive apparatus when taken in conjunction with the accompanying drawings.

In this respect, before explaining the current embodiments of the improved wheeled vehicle drive apparatus in detail, it is to be understood that the wheeled vehicle drive apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved wheeled vehicle drive apparatus. It is therefore important that the claims be regarded as including such equivalent constructions insofar as they do not depart from the spirit and scope of the wheeled vehicle drive apparatus. It is also to be understood that the phraseology and terminology employed herein are for purposes of description and should not be regarded as limiting.

BRIEF DESCRIPTION OF THE DRAWINGS

FIG. 3 is a partial cross sectional view of the drive case of FIG. 1, taken along the line 3-3.

FIG. 4 is a partial cross sectional view of the drive case of FIG. 2, taken along the line 4-4.

DETAILED DESCRIPTION OF THE DRAWINGS

With reference now to the drawings, and in particular FIGS. 1 through 7 thereof, the principles and concepts of the wheeled vehicle drive apparatus generally designated by the reference number 10 will be described.

Figure 1:
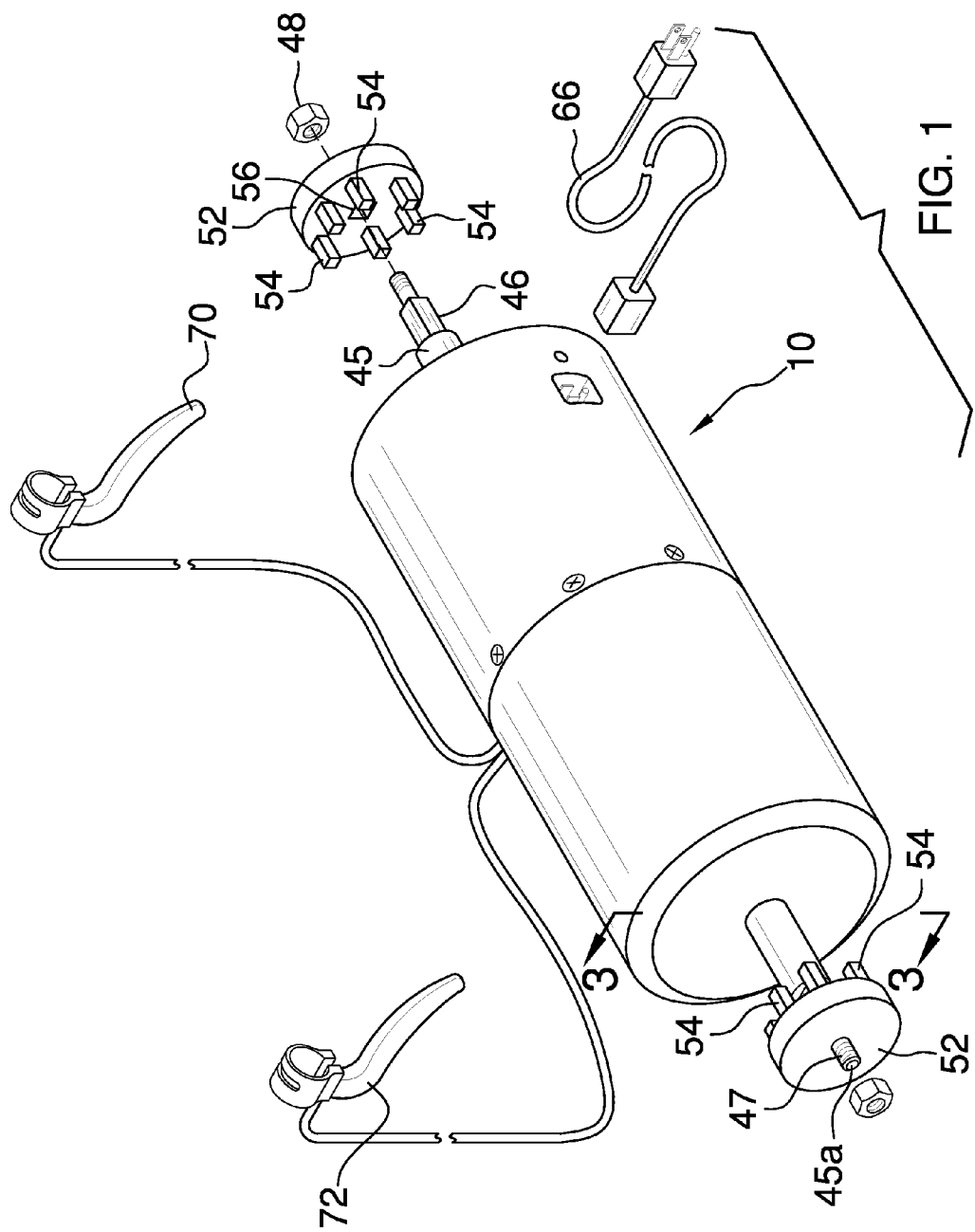
FIG. 1 is a perspective view.

Referring to FIG. 1, the apparatus 10 partially comprises a circular drive case 20 having the first case section 24 removably fastened to the second case section 26. The charge plug 64 is disposed on the second case section 26. The charge indicator light 65 is disposed proximal to the charge plug 64 on the second case section 26. The charge cord 66 is removably disposed in the charge plug 64 for the convenience of operators. The pair of identical adapters 52 is provided.

Referring to FIGS. 3, 4 and 5, and again to FIG. 1, the subcompartment 25 is disposed on the first case section 24. The two-ended axle 45 is removably disposed centrally within the case 20. The axle 45 is extended exteriorly from each case section. A bearing 34 in each case section rotationally supports the axle 45. The slave gear 44 is removably centrally disposed on the axle 45. A thread 47 is disposed on each axle 45 end. A nut 48 is removably fitted to each thread 47. A square drive 46 is disposed medially on each axle 45 end. The electric motor 40 is disposed substantially within the first case section 24 subcompartment 25. The drive gear 42 is disposed on the motor 40. The drive gear 42 is engaged with the slave gear 44. The rechargeable battery 60 is disposed within the case 20. The drive case 20 cylindrical design and space utilization provide the inclusive battery 60, motor 40, and control box 62 advantage. The control box 62 is disposed within the case 20. The control box 62 is in communication with the motor 40. The battery 60, the charge indicator light 65, and the charge plug 64 are in communication with the control box 62.

Figure 2:
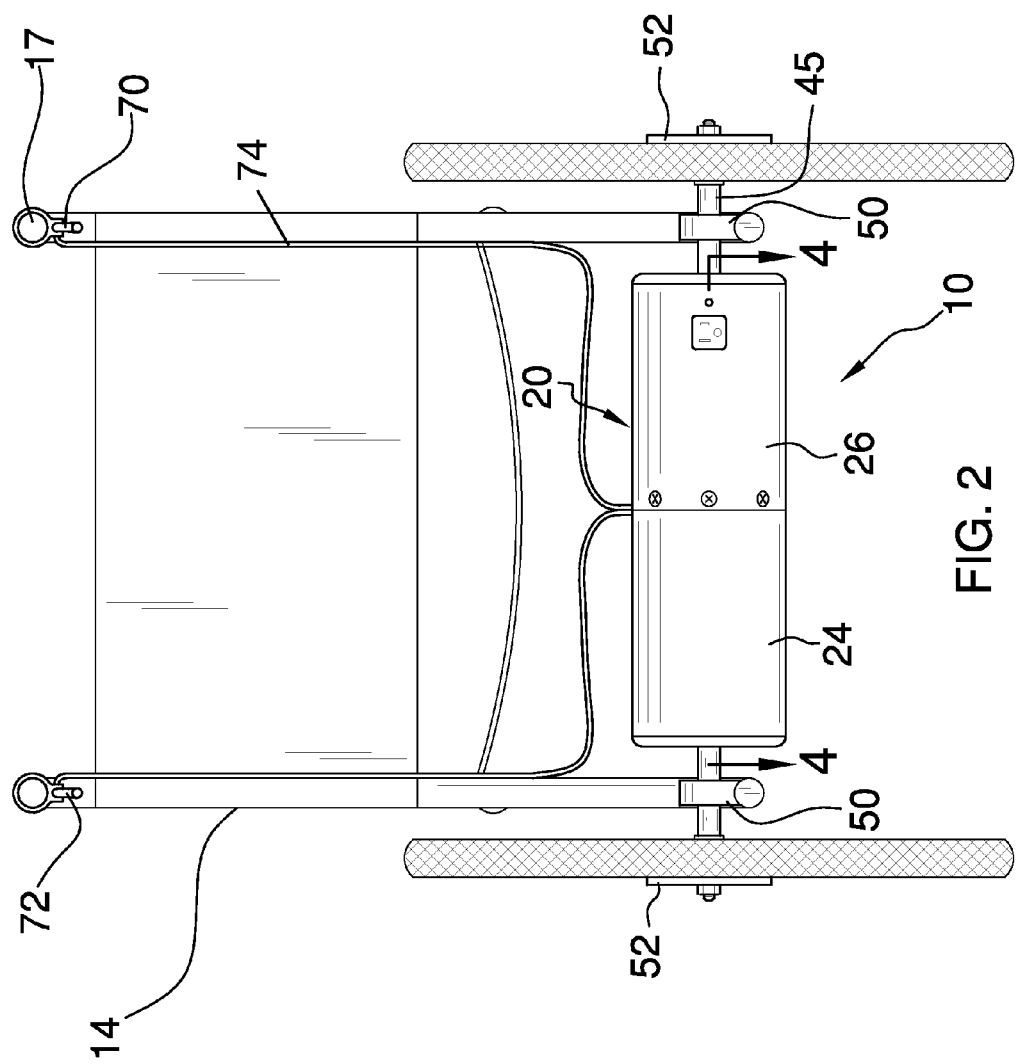
FIG. 2 is a rear elevation view of the apparatus installed on a wheelchair.
Figure 5:
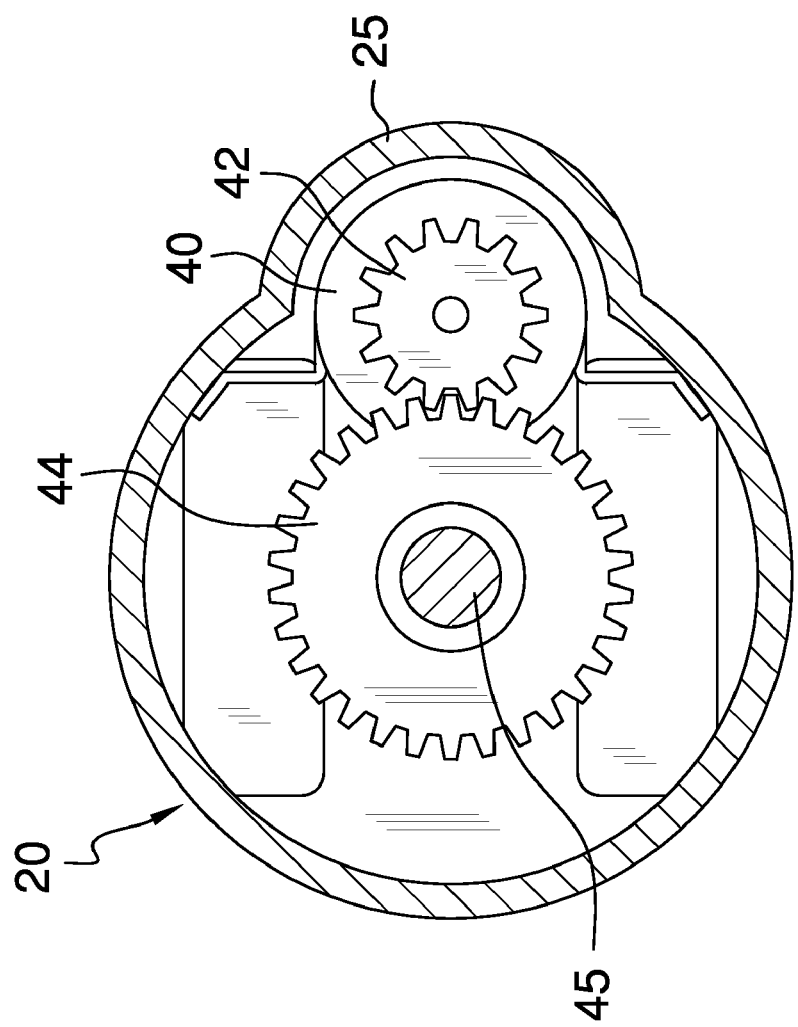
FIG. 5 is a cross sectional view of FIG. 3, taken along the line 5-5.

Referring now to FIGS. 6 and 7 and again to FIGS. 1 and 2, the throttle lever 70 is affixed to an existing handle 17 of a wheeled vehicle such as the existing wheelchair 14 or the existing cart 12. The brake lever 72 is affixed to an existing handle 17 of the wheeled vehicle. Levers may be fitted as chosen. The communication between the throttle lever 70 and the brake lever 72 with the control box 62 is via wires 74.

Figure 6:
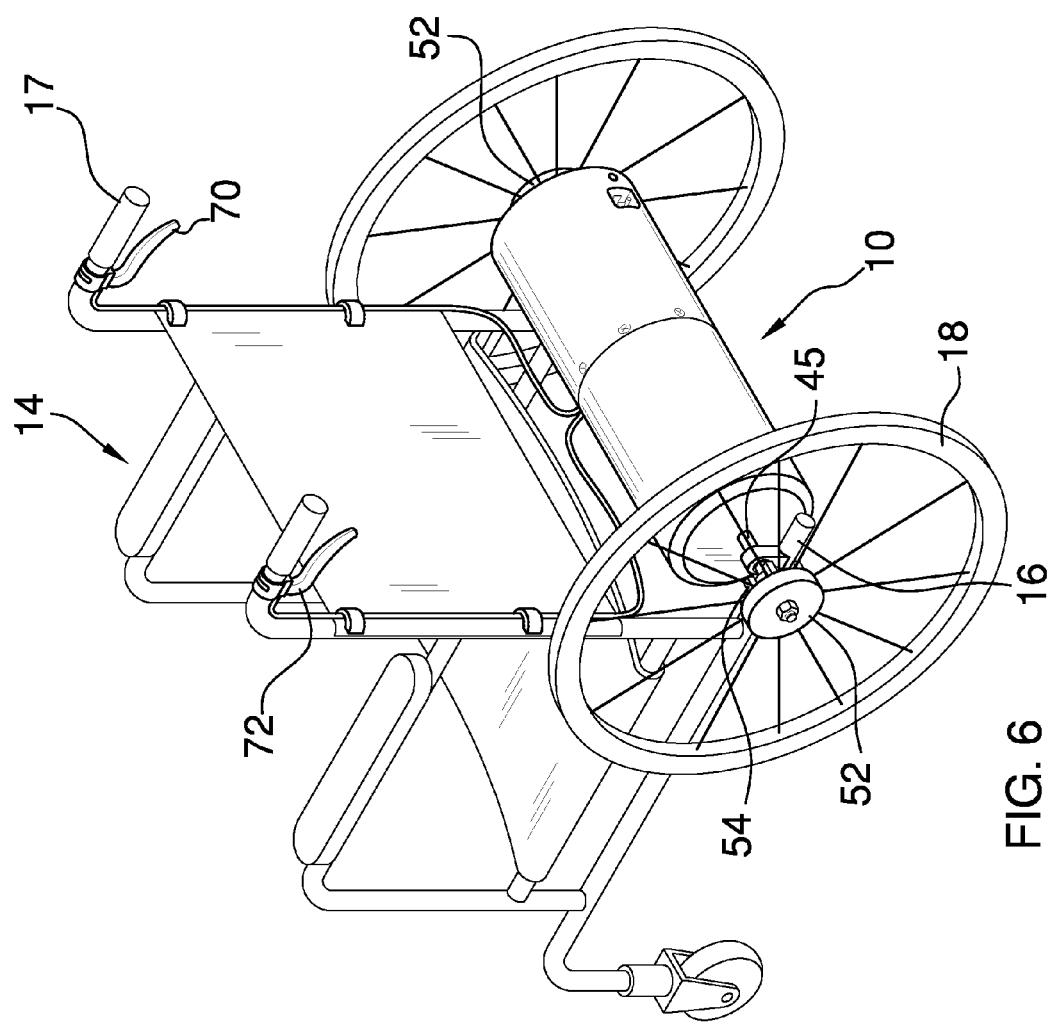
FIG. 6 is a perspective view of the apparatus installed on a wheelchair.
Figure 7:
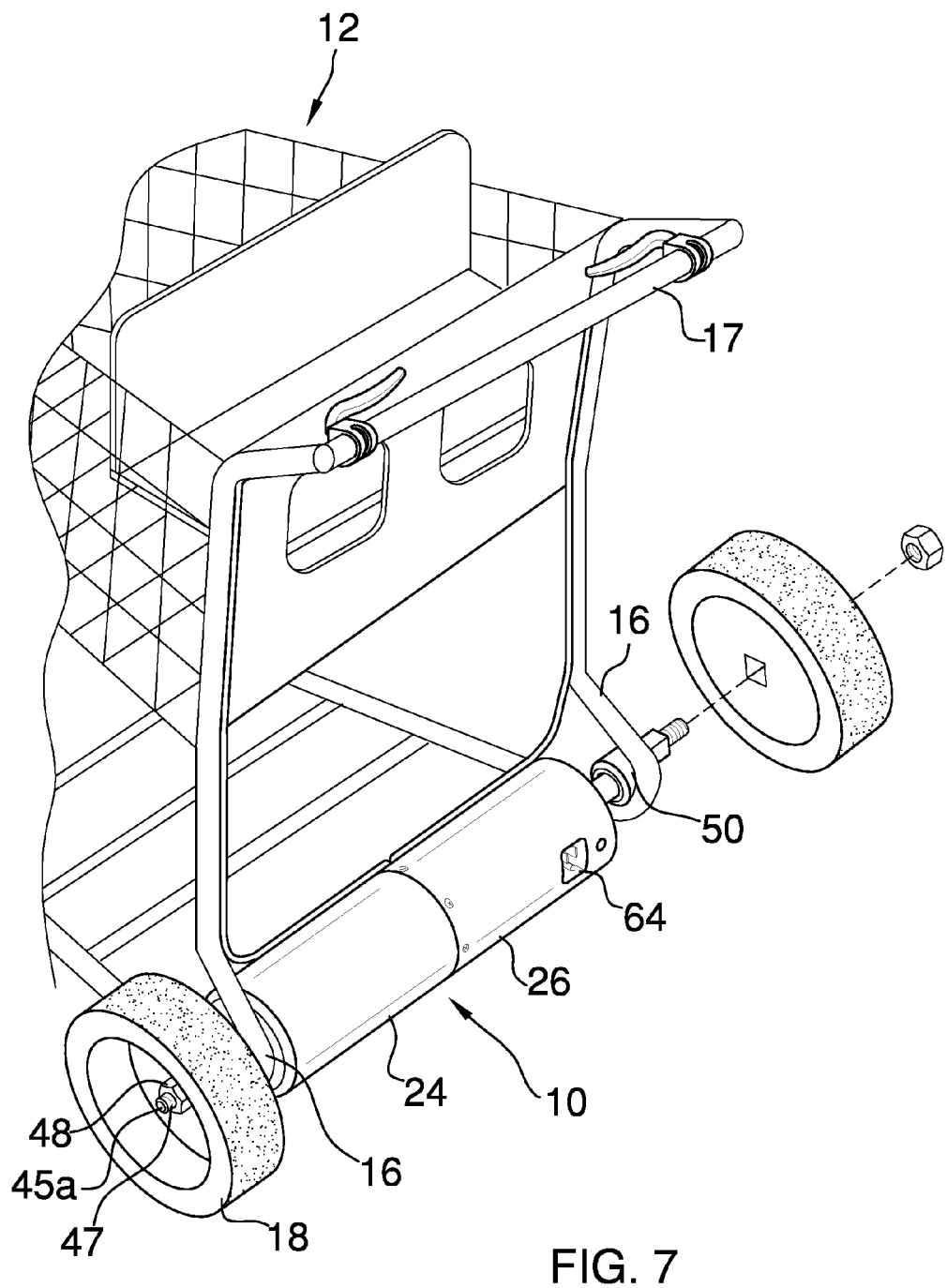
FIG. 7 is a perspective view of the apparatus installed on a shopping cart.

Referring to FIGS. 1 and 7, the square drive 46 provides a positive connection with existing wheels 18 of the existing cart 12. Referring to FIGS. 1 and 6, a square drive 46 is disposed medially on each axle end 45a. Each square drive 46 is inserted through one of each of the existing wheels 18 of the existing wheelchair 14. The pair of identical circular adapters 52 is provided. One of each of the pair of circular adapters 52 is removably externally fitted to the exterior of one of each of the two wheels 18 of the wheelchair 14. The plurality of spaced apart adapter lugs 54 is disposed on each circular adapter 52. Each adapter lug 54 is inserted through a plurality of existing spokes of the wheelchair 14. The square receiver 56 is disposed centrally within each adapter 52. Thereby, each square drive 46 of each axle end 45a of the axle 45 is inserted within each of one of square receivers 56.

Referring to FIG. 7, the shopping cart 12 is fitted with external bearings 50 of the apparatus 10 that are fastened to the existing frame 16 of the cart 12.

With respect to the above description then, it is to be realized that the optimum dimensional relationships for the parts of the wheeled vehicle drive apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the wheeled vehicle drive apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the wheeled vehicle drive apparatus may be used.

Therefore, the foregoing is considered as illustrative only of the principles of the wheeled vehicle drive apparatus. Further, since numerous modifications and changes will readily occur to those skilled in the art, it is not desired to limit the wheeled vehicle drive apparatus to the exact construction and operation shown and described, and accordingly, all suitable modifications and equivalents may be resorted to, falling within the scope of the wheeled vehicle drive apparatus.

What is claimed is:

1. A wheeled vehicle drive apparatus for installation on an existing wheeled vehicle comprising:
   a drive case;
   a recessed charge plug disposed on the case;
   a charge indicator light disposed proximal to the charge plug;
   a charge cord removably disposed in the charge plug;
   a subcompartment disposed on the case;
   an axle disposed centrally within the case, the axle having a pair of spaced apart axle ends, each axle end extended exteriorly from the case;
   a slave gear centrally disposed on the axle;
   a thread disposed on each axle end;
   a nut removably fitted to the thread;
   a square drive disposed medially on each axle end, the square drive inserted into an existing wheel of the wheeled vehicle;
   an electric motor disposed substantially within the case subcompartment;
   a drive gear disposed on the motor, the drive gear engaged with the slave gear;
   a rechargeable battery disposed within the case;
   a control box disposed within the case, the control box in communication with the motor, the battery, the charge indicator light, and the charge plug;
   a throttle lever affixed to an existing handle of the wheeled vehicle, the throttle lever in communication with the control box;
   means for braking the wheeled vehicle;
   wherein means for braking the wheeled vehicle further comprises a brake lever affixed to the existing handle of the wheeled vehicle; and
   wherein the brake lever is further in communication with the control box.

2. The apparatus according to claim 1 wherein the drive case further comprises a pair of separable case sections.

3. A wheeled vehicle drive apparatus for installation on an existing wheeled vehicle comprising:
   a cylindrical drive case having a first case section removably fastened to a second case section;
   a recessed charge plug disposed on the second case section;
   a charge indicator light disposed proximal to the charge plug on the second case section;
   a charge cord removably disposed in the charge plug;
   a subcompartment disposed on the first case section;
   a two-ended axle having a pair of identical spaced apart axle ends, the axle removably disposed centrally within the case, the axle extended exteriorly from each case section;
   a slave gear removably centrally disposed on the axle;
   a thread disposed on each axle end;
   a square drive disposed medially on each axle end, each square drive inserted through a one of each of an existing wheel of a pair of wheels of the wheeled vehicle;
   a pair of identical circular adapters, one of each of the pair of circular adapters removably externally fitted to an exterior of one of each of the two wheels of the wheeled vehicle;
   a plurality of spaced apart adapter lugs disposed on each circular adapter, each adapter lug inserted through a plurality of existing spokes of the wheeled vehicle;

a square receiver disposed centrally within each adapter, whereby each square drive of each axle end is inserted within each of one of the square receivers;

a nut removably fitted to each thread, whereby each adapter is secured to each wheeled vehicle wheel;

an electric motor disposed substantially within the first case section subcompartment;

a drive gear disposed on the motor, the drive gear engaged with the slave gear;

a rechargeable battery disposed within the case;

a control box disposed within the case, the control box in communication with the motor, the battery, the charge indicator light, and the charge plug;

a throttle lever affixed to an existing handle of the wheeled vehicle;

a brake lever affixed to an existing handle of the wheeled vehicle;

a communication between the throttle lever and the brake lever with the control box.

\* \* \* \* \*